(12) United States Patent
Peng

(10) Patent No.: US 7,570,002 B2
(45) Date of Patent: Aug. 4, 2009

(54) TEMPERATURE TRIPPING DEVICE

(75) Inventor: Xiaoming Peng, Öhringen (DE)

(73) Assignee: Kriwan Industrie-Elektronik GmbH, Forchtenberg (DE)

( * ) Notice: Subject to any disclaimer, the term of this patent is extended or adjusted under 35 U.S.C. 154(b) by 0 days.

(21) Appl. No.: 12/044,149

(22) Filed: Mar. 7, 2008

(65) Prior Publication Data
US 2008/0218110 A1 Sep. 11, 2008

(30) Foreign Application Priority Data
Mar. 7, 2007 (DE) .................. 10 2007 011 468

(51) Int. Cl.
G05B 5/00 (2006.01)
(52) U.S. Cl. .................. 318/473; 318/455; 318/442; 318/445
(58) Field of Classification Search .................. 318/473, 318/455, 442, 445, 798, 806, 807, 430; 361/27, 361/29, 44, 24
See application file for complete search history.

(56) References Cited

U.S. PATENT DOCUMENTS 6,259,074 B1* 7/2001 Brunner et al. ............. 219/497

2005/0128660 A1* 6/2005 Dlugosz et al. ............... 361/23

FOREIGN PATENT DOCUMENTS

DE 36 14 552 11/1987

* cited by examiner

Primary Examiner—Karen Masih
(74) Attorney, Agent, or Firm—Stites & Harbison PLLC; Ross F. Hunt, Jr.

(57) ABSTRACT

The invention relates to a temperature tripping device for reliably shutting down a load, especially a motor, having at least one input for receiving at least one temperature-dependent sensor signal as an input signal, a first evaluation circuit for generating a first output signal if the input signal reaches a preset value, and means for generating a trip signal if the output signal is generated. In addition, a second, redundant, evaluation channel is provided which is supplied with the same input signal as the first evaluation channel and which generates a second output signal if the input signal reaches the preset value, wherein the means for generating a trip signal are connected to the two evaluation channels and generate the trip signal if at least one of the two output signals is generated.

9 Claims, 4 Drawing Sheets

TEMPERATURE TRIPPING DEVICE

The invention relates to a temperature tripping device for reliably shutting down a load, especially a motor, having at least one input for receiving at least one temperature-dependent input signal, an evaluation circuit for generating an output signal if the input signal reaches a preset value, and means for generating a trip signal if the output signal is generated.

Nowadays, safety-related tasks are increasingly being assumed by electronic equipment. A typical example is a temperature tripping device of a motor-driven machine. The temperature tripping device detects the temperature of the machine or system by means of temperature sensors. The detected temperature data are evaluated and compared with pre-defined danger criteria. If the danger criteria are met, the tripping device opens the safety chain by means of a switching element, for example a relay, and thus shuts down the machine (motor) or system.

Owing to the tremendous pace of development in microcontroller technology, but also because of the comprehensive measures taken to eliminate faults and because of the ever increasing number of functions, such as diagnosis and communication capabilities, evaluation is increasingly being carried out with microcontrollers.

The weak point of such evaluation circuits resides, however, in the susceptibility of the components to interference. As the number and complexity of components increases, so too does the probability of failure. Furthermore, in the case of microcontrollers, faults in the microelectronics and software errors may be added to this. In that situation, just a single fault or error may disable the monitoring function, with the result that, without its being noticed, the machine or system to be monitored operates without protection.

A protective switching device in installation technology is described in DE-A1-36 14 552. To increase safety, a redundant component is provided therein for every electronic component.

The object of the invention is further to improve the temperature tripping device so as to ensure especially a higher level of safety.

According to the invention, that object is attained by means of the features of claim 1.

The temperature tripping device according to the invention for reliably shutting down a load, especially a motor, substantially consists of at least one input for receiving at least one temperature-dependent sensor signal as an input signal, a first evaluation channel for generating a first output signal if the input signal reaches a preset value, and means for generating a trip signal if the output signal is generated. In addition, a second, redundant, evaluation channel is provided which is supplied with the same input signal as the first evaluation channel and which generates a second output signal if the input signal reaches the same preset value, wherein the means for generating a trip signal are connected to both evaluation channels and generate the trip signal if at least one of the two output signals is generated.

In contrast to the protective switching device known from DE-A1-36 14 552, according to the invention two evaluation channels that are independent of each other are provided which monitor the same preset value. What is involved, therefore, are redundant evaluation channels, which ensure a higher safety requirement level.

The second evaluation channel is preferably formed by an analogue circuit. In the two evaluation channels, the evaluation procedure operates independently of the other evaluation channel. In that manner, it is ensured that the complete monitoring function, including the monitoring criterion of the tripping device, is ensured unchanged and without restriction even when as a result of interference or faults one of the evaluation channels is no longer able to generate an output signal to generate a trip signal.

The function of the second evaluation channel is preferably restricted to a purely monitoring function. This on the one hand has a cost advantage and on the other hand increases the reliability of the device through the reduced failure rate of components. Functions that are not safety-related, such as diagnosis and communication, should therefore be implemented exclusively in the first evaluation channel.

According to a preferred illustrative embodiment, the second evaluation channel has a low-pass filter to filter out any EMC interference. In addition, it may include a comparator, especially a Schmitt trigger comparator, at the output of which the output signal is generated. At one input of the comparator, the preset value could be formed by two resistors, whilst at the other input the input signal is applied. The two evaluation channels are each provided with a switching element which forms an AND combination with the means (relay) for generating a trip signal (open relay contact) in accordance with the following condition:

> relay contact pulled in=conductive switching element of the first evaluation channel AND conductive switching element of the second evaluation channel.

The invention further relates to a motor having at least one temperature sensor for monitoring at least one parameter of the motor and having the temperature tripping device described above, wherein the temperature sensor is associated with the input signal of the temperature tripping device and generates a temperature-dependent sensor signal which is supplied as the input signal to the input of the temperature tripping device.

Further advantages and embodiments of the invention will be described in detail below by means of a description of a number of illustrative embodiments and with reference to the drawings.

In the drawings:

FIG. 1 is a block diagram of a temperature tripping device according to the invention, FIG. 2 is a circuit diagram of a temperature tripping device having at least one analogue evaluation channel and a first variant of the combination of switching elements, FIG. 3 is a circuit diagram of a temperature tripping device having at least one analogue evaluation channel and a second variant of the combination of switching elements, FIG. 4 is a circuit diagram of a temperature tripping device having two analogue evaluation channels, FIG. 5 is a circuit diagram of a temperature tripping device having a plurality of temperature sensors connected to one input, and FIG. 6 is a circuit diagram of a temperature tripping device having a plurality of inputs.

FIG. 1 illustrates a temperature tripping device S for reliably shutting down a load V, especially a motor. The load V has at least one temperature sensor 1, especially a PTC resistor, which generates a temperature signal which is supplied as an input signal to an input 2 of the temperature tripping device S.

The construction and operation of the temperature tripping device S will be described in detail below with reference to FIG. 1 and FIG. 2.

The temperature tripping device S has first of all a voltage conversion circuit 3 which converts the temperature-dependent resistance value of the temperature sensor 1 into a voltage value. That may be done, for example, via the resistor circuit with $R_a$ and $R_b$ as illustrated in the Figures. The converted input signal is then fed to a first evaluation channel 4 and, in parallel, to a second, redundant, evaluation channel 5. The two evaluation channels operate completely independently of each other and monitor the same preset value.

The first evaluation channel 4 is optionally formed either as an analogue circuit or with a microcontroller. At the output of the first evaluation channel 4, the output signal that controls a switching element, especially a transistor $T_1$, is generated.

The second evaluation channel 5 is implemented by an analogue circuit having first of all a low-pass filter 6 for filtering out any EMC interference. In addition, a comparator 7, especially a Schmitt trigger comparator, is provided, at the output of which the output signal that controls a switching element, especially a transistor $T_2$, is generated.

The low-pass filter 6 ensures that the EMC interference coupled in via the temperature sensor 1 and its supply lines is substantially filtered out. For that purpose, a second-order analogue low-pass filter (Butterworth), for example, is used. It consists of the resistors R1, R2 and the capacitors C1 and C2 and the operational amplifier $OP_1$.

The Schmitt trigger comparator 7, which can be seen from FIG. 2, is formed by the resistors R3, R4 and R5 and the capacitor C3 and the operational amplifier $OP_2$. At the two inputs of the operational amplifier $OP_2$, in the one case the input signal corresponding to the temperature of the load is applied and, in the other case, the preset value defined by R3 and R5 is applied, and the two are compared with each other. If the temperature is higher than the preset value, the operational amplifier switches to "low" and blocks the switching element formed by the transistor $T_2$.

In addition, means 8 for generating a trip signal are provided which are formed, for example, by a relay. The switching element $T_2$ of the second evaluation channel 5 and the corresponding switching element $T_1$ of the first evaluation channel 4 form an AND combination and are connected to the means 8 in accordance with the following condition:

relay contact pulled in=conductive switching element
$T_2$ AND conductive switching element $T_1$.

Figure 1:
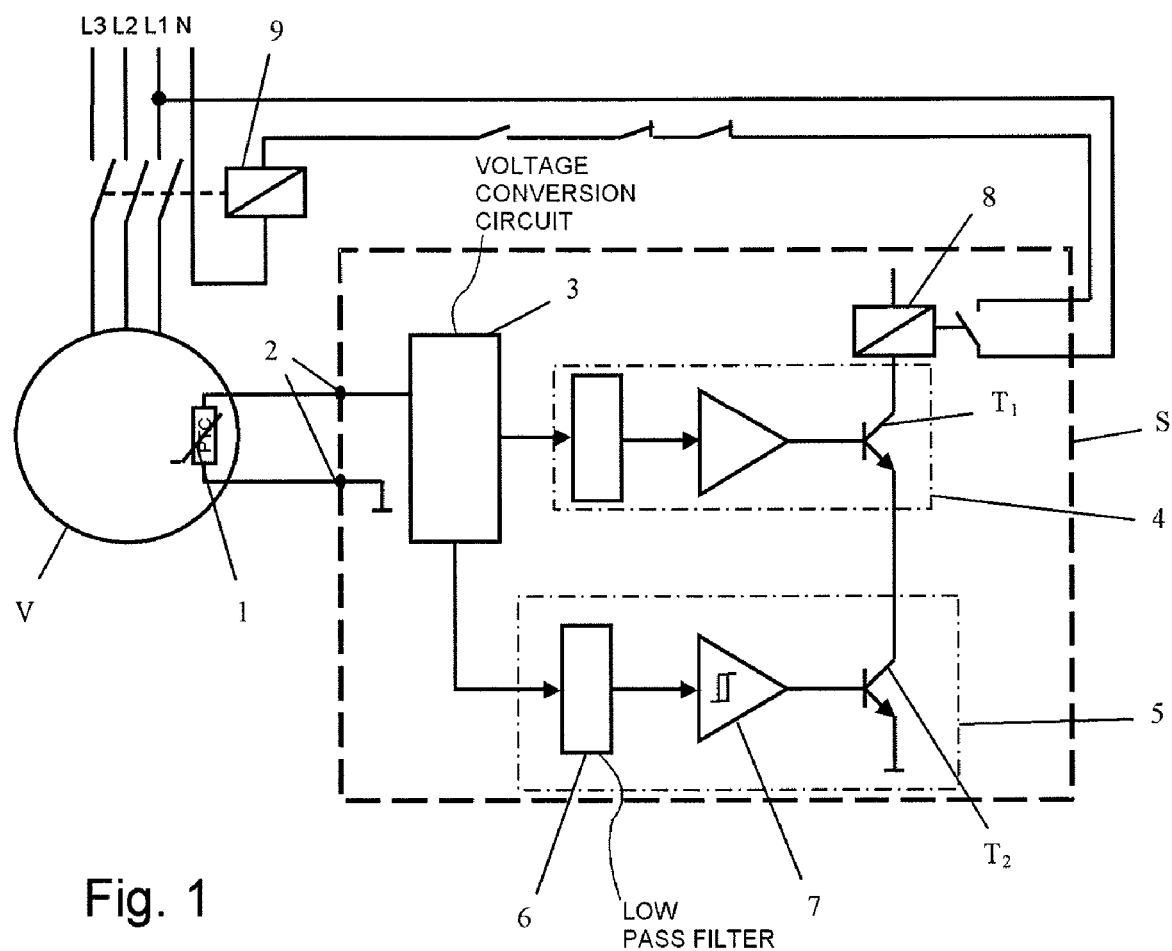
Figure 2:
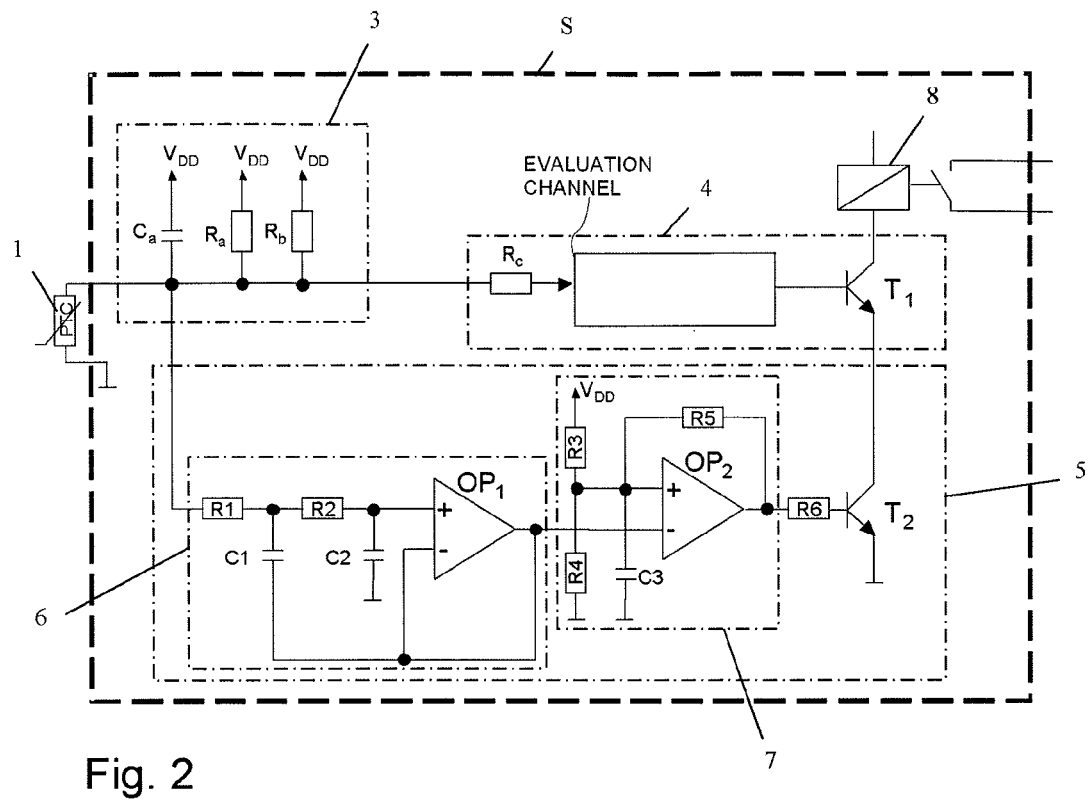
Figure 3:
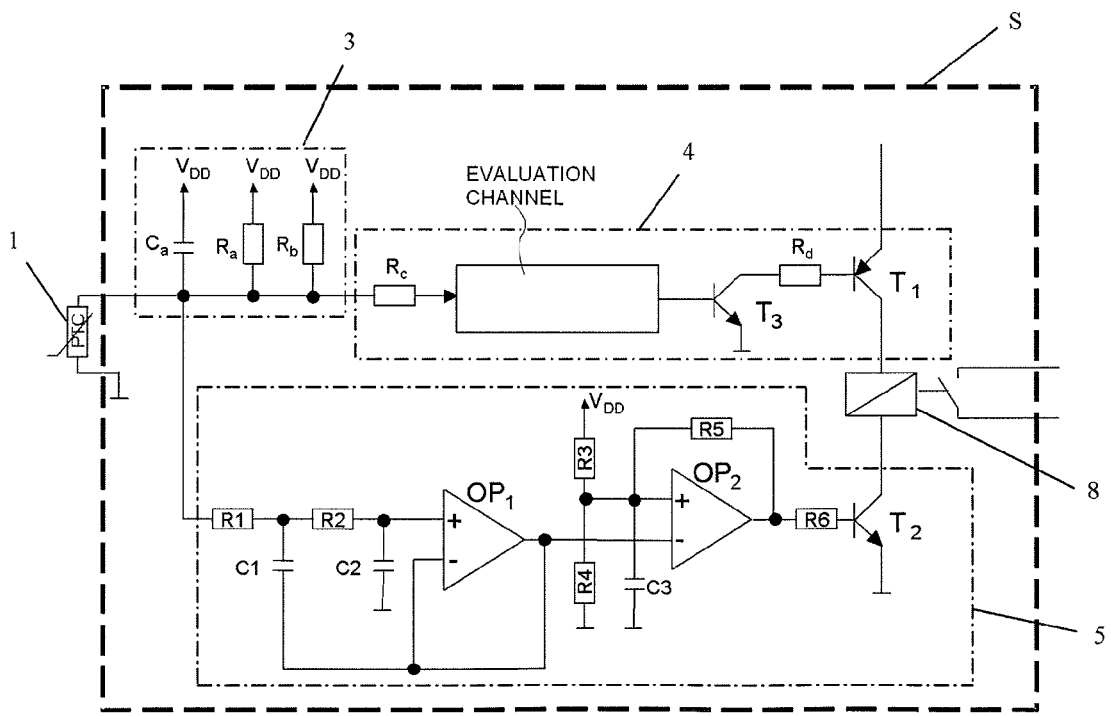
FIG. 3 illustrates an alternative AND combination of the two switching elements $T_1$ and $T_2$ connected to the means 8 for generating the trip signal.
Figure 4:
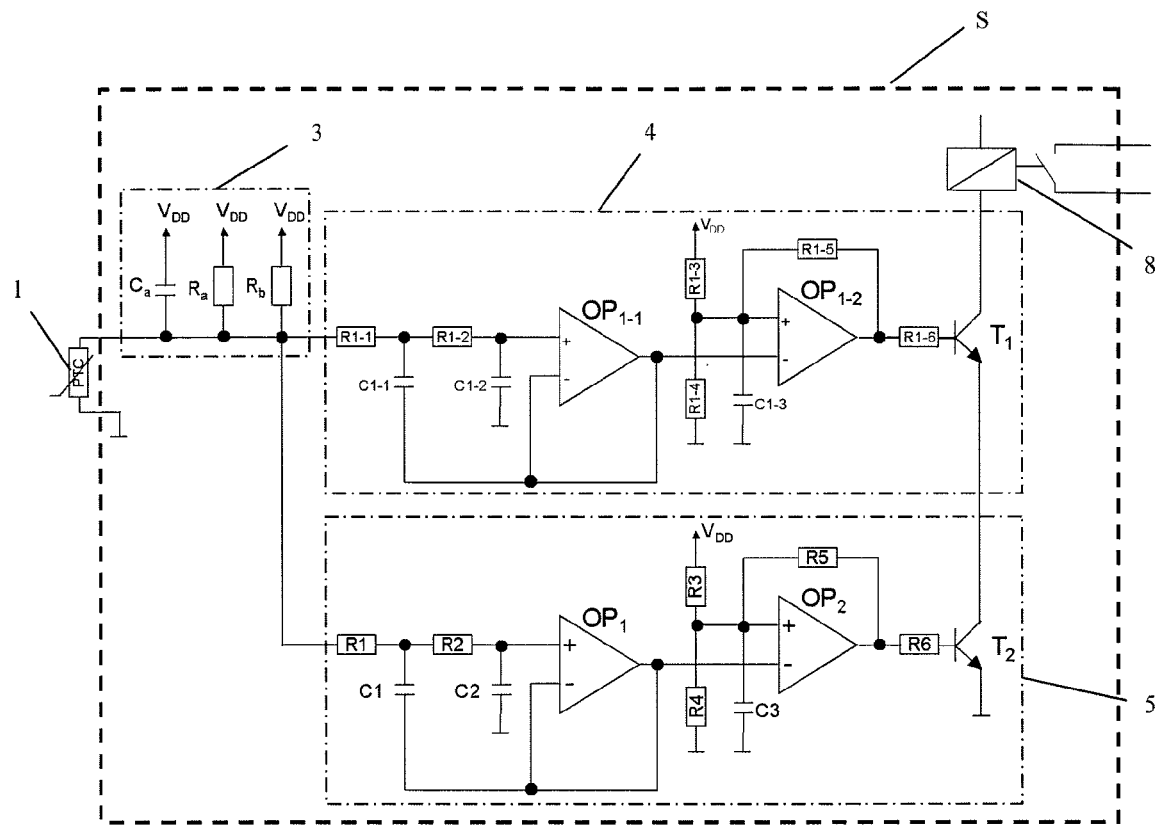
FIG. 4 shows a circuit diagram of a cost-optimized temperature tripping device with two analogue evaluation channels which are advantageously of identical construction.
Figure 5:
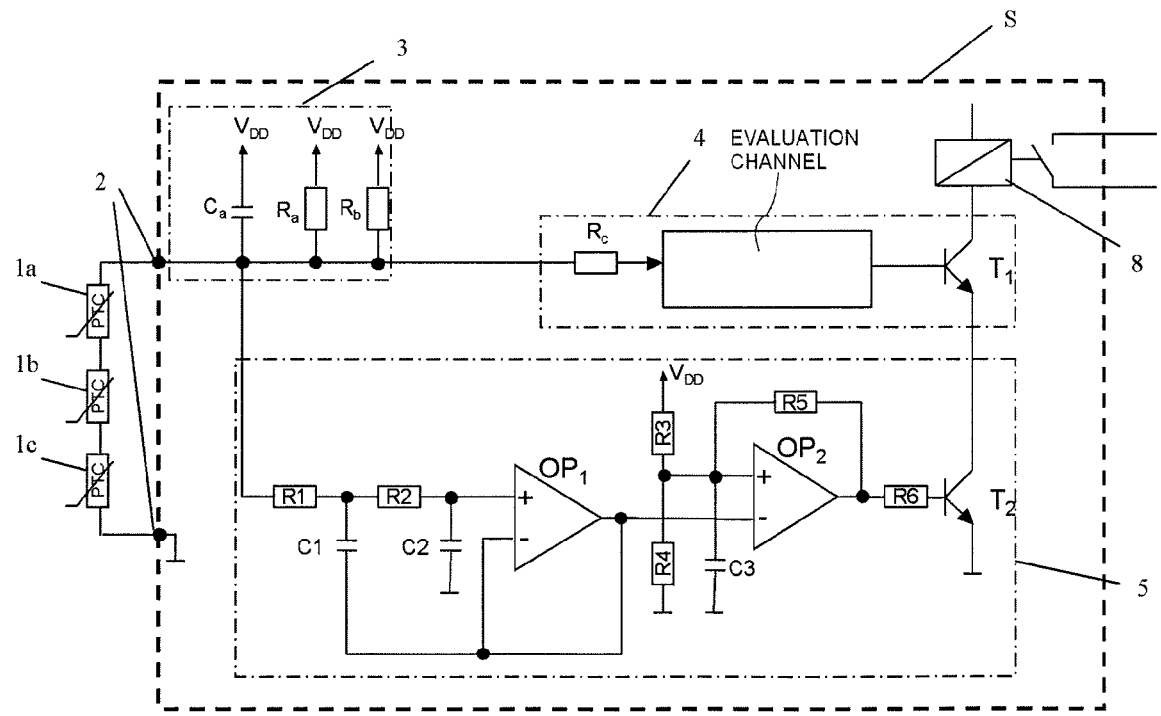

The load V shown in FIG. 5 has three series-connected temperature sensors 1a, 1b, 1c for monitoring the temperature of the motor and has a temperature tripping device S. With a plurality of temperature sensors fitted at various points of the load V, the tripping device is able to monitor, for example, the temperatures in the three windings of a three-phase motor. By connecting the temperature sensors in series, a cost-optimized solution for monitoring various parameters and/or various points of a load is achieved.

Figure 6:
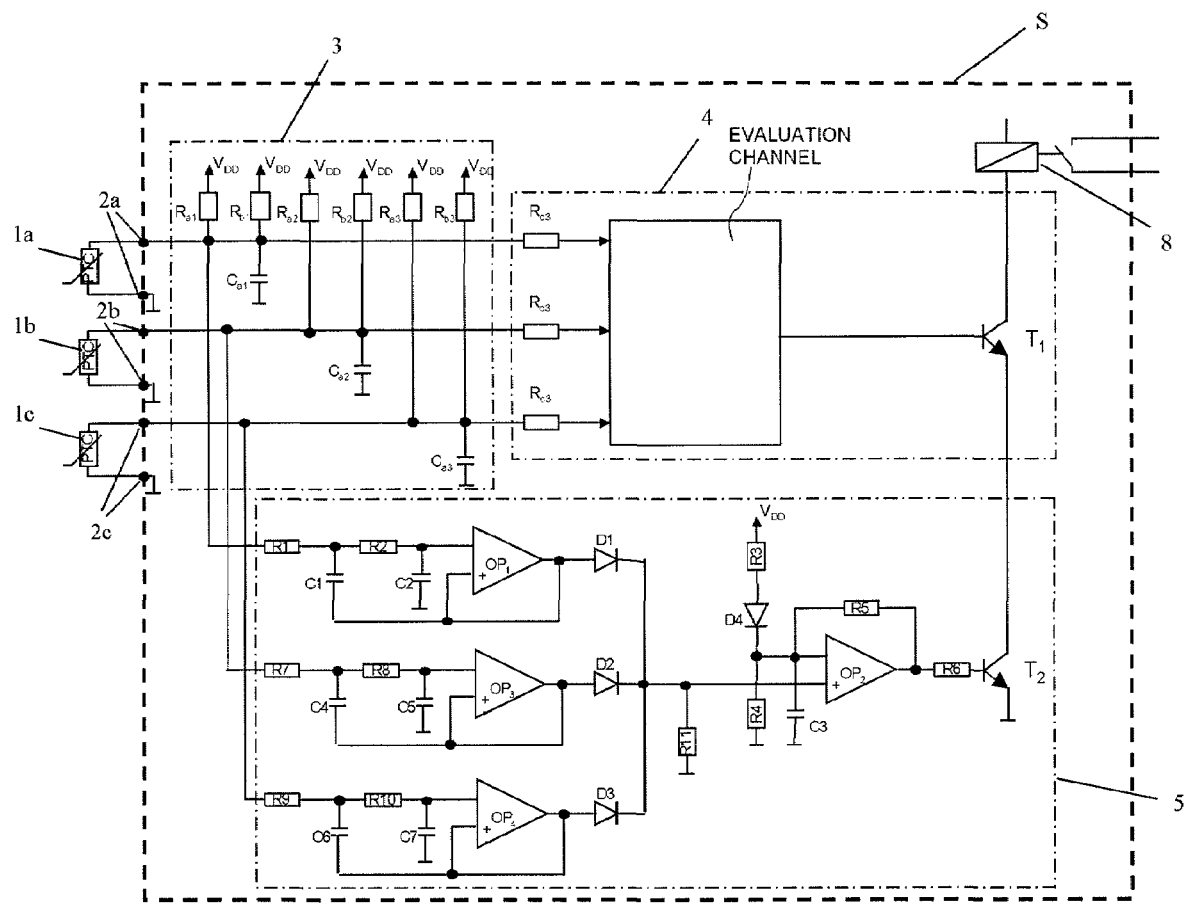

FIG. 6 shows that the temperature tripping device can also provide three inputs 2a, 2b, 2c, each input being connected to one of the three temperature sensors 1a, 1b, 1c. If the evaluation channel 5 is in the form of an analogue circuit, a separate low-pass filter is first provided for each input. By means of the diode circuit formed by the diodes D1, D2 and D3, only the signal corresponding to the highest temperature is passed to the comparator. This ensures that reaching of the preset value by any one of the temperatures to be monitored reliably results in tripping. The diode D4 in the comparator circuit is used for temperature compensation of the temperature-dependent voltage drop of the diodes D1, D2 and D3.

The invention claimed is:

1. A temperature tripping device for reliably shutting down a load, having at least one input for receiving at least one temperature-dependent sensor signal as an input signal, a first evaluation channel for generating a first output signal if the input signal reaches a preset value, and means for generating a trip signal if the output signal is generated, characterised by a second, redundant, evaluation channel which is supplied with the same input signal as the first evaluation channel and which generates a second output signal if the input signal reaches the preset value, wherein the means for generating a trip signal is connected to the two evaluation channels and generates the trip signal if at least one of the two output signals is generated, and further characterised in that the second evaluation channel has a low-pass filter for filtering out any EMC interference coupled into the input signal.

2. A temperature tripping device for reliably shutting down a load, having at least one input for receiving at least one temperature-dependent sensor signal as an input signal, a first evaluation channel for generating a first output signal if the input signal reaches a preset value, and means for generating a trip signal if the output signal is generated, characterised by a second, redundant, evaluation channel which is supplied with the same input signal as the first evaluation channel and which generates a second output signal if the input signal reaches the preset value, wherein the means for generating a trip signal is connected to the two evaluation channels and generates the trip signal if at least one of the two output signals is generated, and further characterised in that the second evaluation channel includes a comparator, at the output of which the second output signal is generated.

3. A temperature tripping device according to claim 2, characterised in that at least the second evaluation channel is formed by an analogue circuit.

4. A temperature tripping device according to claim 2, characterised in that a switching element is connected to the output of the comparator.

5. A temperature tripping device according to claim 2, characterised in that the means for generating a trip signal includes a relay.

6. A temperature tripping device according to claim 2, characterised in that the first and the second evaluation channel each comprise a switching element.

7. A temperature tripping device according to claim 6, characterised in that the switching elements of the first and second evaluation channels form an AND combination and are connected to a relay in accordance with the following condition:

a relay contact of the relay is pulled in in response to switching on of the conductive switching element of the first evaluation channel AND the conductive switching element of the second evaluation channel so that the relay contact drops out in response to blocking of the conductive switching element of at least one of the first and second evaluation channels.

8. A motor having at least one temperature sensor for monitoring the temperature of the motor and having a temperature tripping device according to claim 2, wherein the temperature sensor is connected to the at least one input of the temperature tripping device.

9. A temperature tripping device for reliably shutting down a load, having at least one input for receiving at least one temperature-dependent sensor signal as an input signal, a first evaluation channel for generating a first output signal if the input signal reaches a preset value, and means for generating a trip signal if the output signal is generated, characterised by a second, redundant, evaluation channel which is supplied with the same input signal as the first evaluation channel and which generates a second output signal if the input signal reaches the preset value, wherein the means for generating a trip signal is connected to the two evaluation channels and generates the trip signal if at least one of the two output signals is generated, and further characterised in that the preset value is formed by two resistors and is applied to one input of a comparator of the second evaluation circuit, and the input signal is filtered through a low-pass filter and is applied to a further input of the comparator.

* * * * *